Figures 1, 2:
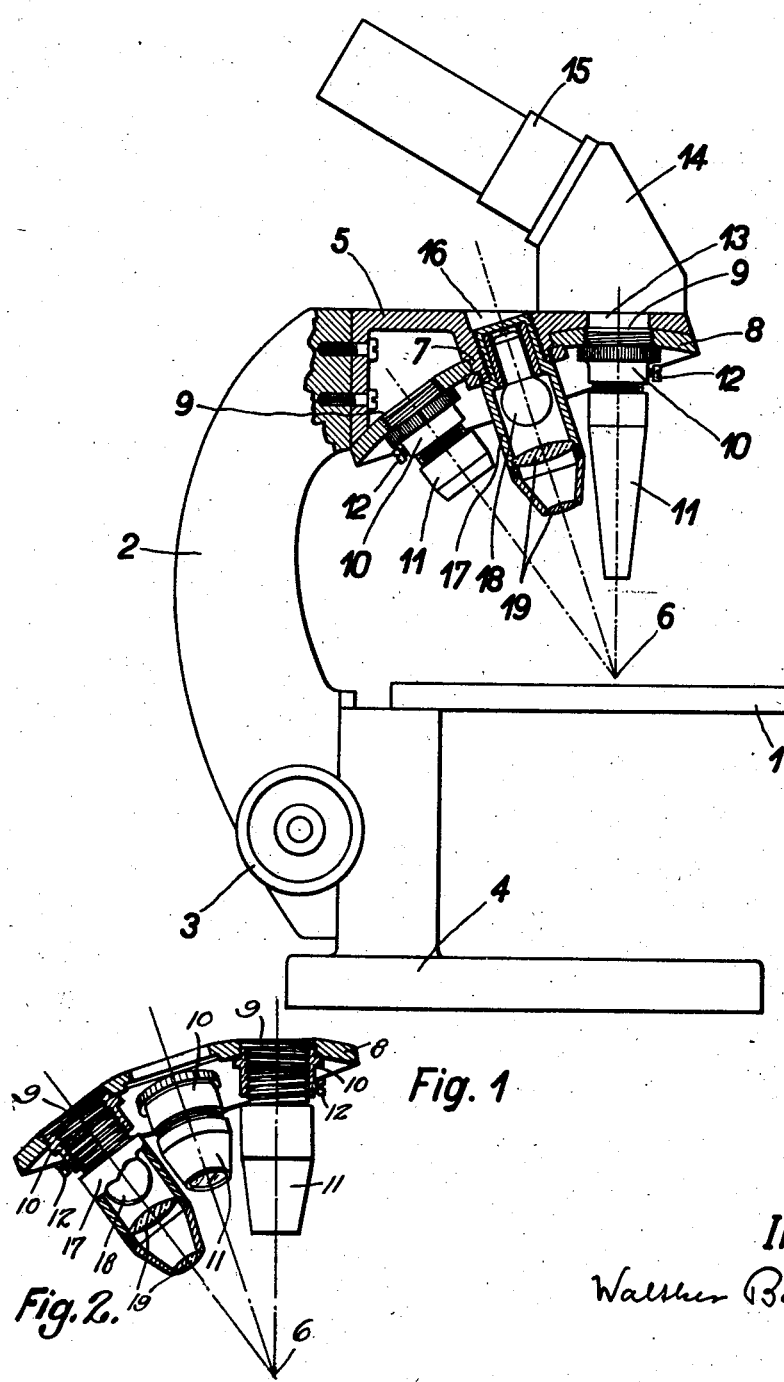

Dec. 18, 1934.   W. BAUERSFELD   1,985,073
NOSE PIECE FOR MICROSCOPE OBJECTIVES
Filed Oct. 19, 1933

Inventor:
Walther Bauersfeld.

Patented Dec. 18, 1934

1,985,073

UNITED STATES PATENT OFFICE 1,985,073

NOSE-PIECE FOR MICROSCOPE OBJECTIVES

Walther Bauersfeld, Jena, Germany, assignor to the firm Carl Zeiss, Jena, Germany Application October 19, 1933, Serial No. 694,267
In Germany October 22, 1932

6 Claims. (Cl. 88—39)

I have filed an application in Germany, October 22, 1932.

The usual nose-piece for microscope objectives which consists of a fixed part and a part rotatable thereon is so constructed as to have the axes of the objectives attached to the rotatable part intersect each other at a point lying at that side of the nose-piece which does not face the object. This means, however, that the objectives go apart towards the object and that, therefore, nose-pieces equipped with objectives of this kind are rather bulky. To avoid this inconvenience, the invention aims at constructing the nose-pieces for monobjective as well as for binobjective microscopes in such a manner that the axes of the objectives attached to the rotatable part of the nose-piece intersect each other at a point lying at the object side and coinciding approximately with that point of the object plane which lies in the axis of rotation of the nose-piece. As the axes of the objectives necessarily converge from the nose-piece, a very compact construction is obtained in this manner and, instead of being convex, the nose-piece is concave at the side facing the object.

Those two surfaces of the two parts of the nose-piece which are in contact with each other may have any suitable form, for instance that of conical surfaces. It is however specially advantageous to give the fixed part of the nose-piece the form of part of a hollow sphere the centre of which lies approximately at the point of intersection of the axes of the objectives. A very suitable constructional form is obtained by attaching the fixed part of the nose-piece not to the microscope tube, as is the usual practice, but to the microscope stand direct, and to provide that this fixed part supports the ocular part of the microscope, for instance the microscope tube, or, when there is no real microscope tube, a prism housing and the appertaining ocular tube.

With a view to avoiding subsequently to a change of objectives by means of the nose-piece any greater focusing movements of the microscope and to dispensing with the fine adjustment of the objectives by readjusting the contact surfaces, which has been necessary in most cases, it is advisable to provide the movable part of the nose-piece with devices which so hold the objectives as to have them adjustable in their axial directions.

To effect observations not only with transmitted but also with incident light, the nose-piece may be further improved by so attaching to its rotatable part an illumination system emitting a directed pencil of illumination rays that the point of intersection of the objective axes lies approximately in the axis of the pencil of illumination rays, the axis of the pencil of illumination rays coinciding for instance with the axis of rotation of the nose-piece. Another suitable constructional form is obtained by substituting the illumination device for an objective in the rotatable part of the nose-piece. Also this arrangement provides that a change of objectives by means of a rotation of the rotatable part of the nose-piece will not disturb the illumination of those parts of the object which lie within the reach of the objectives.

The accompanying drawing, which illustrates the invention, represents a constructional example of a microscope provided with the new nose-piece. Figure 1 shows the microscope in part-sectional elevation. Figure 2 represents another constructional form of the nose-piece in section.

The constructional example is a monocular microscope (Figure 1) which has a fixed stage 1 and a pillar bracket 2 attached to the base 4 for up and down adjustment by means of a milled head 3. To the upper end of the pillar bracket 2 is screwed a body 5 whose lower surface is spherical, the centre of sphere lying approximately at a point 6 in the surface of an object placed on the stage 1. The central part of the body 5 is constructed as a bearing 7 for a rotatable spherical plate 8 bounded by concentric surfaces. The axis of the bearing is so inclined relatively to a vertical line as to pass through the point 6. Around the bearing 7, the spherical plate 8 is provided with threaded bores 9 for sleeves 10 into which the objectives 1 are screwed, these objectives being fixed by means of pressure screws 12. Accordingly, the axes of the bores 9 coincide with the optical axes of the objectives 11 and intersect each other at the point 6. The body 5 has a viewing aperture 13 above the point 6 and supports a prism housing 14 in which the pencil of imaging rays is deflected in the known manner and directed into an inclined ocular tube 15. The bearing 7 has a bore 16 into which is screwed the housing 17 of an illumination device that consists substantially of a glowlamp 18 and two condensing lenses 19 whose axes coincide with the axis of rotation of the rotatable part of this nose-piece.

The use of the new nose-piece does not differ in general from that of the nose-pieces known so far. The objectives 11 are to be fixed in the sleeves 10 by means of the screws 12 in such a manner as to assume that position in which the point 6 is imaged in the ocular image plane. The housing 17 of the illumination device is to be so adjusted that the condensing lenses 19 converge at the point 6 the light emitted by the glowlamp 18. When an examination with incident light is to be effected, the glowlamp 18 is to be connected to a suitable source of current, and when it is desired to examine objects with transmitted light, the microscope may be provided with one of the known illumination devices which suit this purpose.

In the second constructional example of the rotatable spherical plate 8 (Figure 2), in which the parts that correspond to parts of the first example have reference figures identical with those of the first example, the illumination device consisting of the housing 17, the glowlamp 18 and the condensing lenses 19 is disposed in one of the bores 9 by means of a sleeve 10. Also with this constructional form, the point 6 lies in the axis of the condensing lenses 19. The use of this spherical plate according to Figure 2 differs from that of the plate according to Figure 1 only in that the angle at which the pencil of illumination rays emitted by the illumination device strikes the object is altered when another objective 11 is applied. On account of the use of one of the bores 9 for the illumination device, the nose-piece according to Figure 2 has one objective 11 less than that according to the first example.

I claim:

1. A nose-piece for microscope objectives, comprising a body adapted to be fixed to a pillar bracket and a part so provided in the said body as to be rotatable about an axis, this rotatable part containing guides for microscope objectives, the axes of these guides intersecting each other on the object side of the nose-piece and approximately in the said axis of rotation.

2. A nose-piece for microscope objectives, comprising a body adapted to be fixed to a pillar bracket and having a concave spherical guide surface and a part so provided in the said body as to be rotatable about an axis, this rotatable part having a convex spherical surface which cooperates with the said concave surface and containing guides for microscope objectives, the axes of these guides intersecting each other on the object side of the nose-piece and approximately at the common centre of the said spherical surfaces.

3. In a nose-piece according to claim 1, an eye-piece attached to the upper side of the said body.

4. A nose-piece for microscope objectives, comprising a body adapted to be fixed to a pillar bracket, a part so provided in the said body as to be rotatable about an axis, and a plurality of microscope objectives so disposed in this part as to be adjustable in the directions of their axes, the axes of these objective intersecting each other on the object side of the nose-piece and approximately at a point in the said axis of rotation.

5. A nose-piece for microscope objectives, comprising a body adapted to be fixed to a pillar bracket, a part so provided in the said body as to be rotatable about an axis, this rotatable part containing guides for microscope objectives, the axes of these guides intersecting each other on the object side of the nose-piece and approximately in the said axis of rotation, and a guide for an illumination device, the axis of this illumination device passing approximately through the point of intersection of the objective axis.

6. A nose-piece for microscope objectives, comprising a body adapted to be fixed to a pillar bracket, a part so provided in the said body as to be rotatable about an axis, this rotatable part containing guides for microscope objectives, the axes of these guides intersecting each other on the object side of the nose-piece and approximately in the said axis of rotation, and a guide for an illumination device, the axis of this illumination device coinciding approximately with the said axis of rotation.

WALTHER BAUERSFELD.